United States Patent
Cs et al.

(10) Patent No.: US 9,196,150 B2
(45) Date of Patent: *Nov. 24, 2015

(54) SYSTEM AND METHOD FOR VIDEO MONITORING OF RESTRICTED AREAS BELOW BUCKET TRUCKS, LINEWORKERS ON POWER DISTRIBUTION POLES OR OTHER ELEVATED LOADS

(71) Applicant: Honeywell International Inc., Morristown, NJ (US)

(72) Inventors: Adishesha Cs, Karnataka (IN); Lokesh Rayasandra Boregowda, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/844,765

(22) Filed: Mar. 15, 2013

(65) Prior Publication Data
US 2014/0267661 A1   Sep. 18, 2014

(51) Int. Cl.
| | | |
|---|---|---|
| H04N 9/47 | (2006.01) | |
| H04N 7/18 | (2006.01) | |
| B60Q 1/26 | (2006.01) | |
| G01S 13/00 | (2006.01) | |
| G08B 21/22 | (2006.01) | |

(52) U.S. Cl.
CPC .............. *G08B 21/22* (2013.01); *H04N 7/185* (2013.01)

(58) Field of Classification Search
CPC ......... G08B 21/22; H04N 7/181; H04N 7/185
USPC .......................................................... 348/77
See application file for complete search history.

(56) References Cited

U.S. PATENT DOCUMENTS

| 2009/0037104 A1* | 2/2009 | Basson et al. ................. 701/213 |
| 2011/0029278 A1* | 2/2011 | Tanigawa ....................... 702/150 |

* cited by examiner

*Primary Examiner* — Hee-Yong Kim
(74) *Attorney, Agent, or Firm* — Wood, Phillips, Katz, Clark & Mortimer

(57) ABSTRACT

A method and system (10) are provided for monitoring a restricted area (12) below a temporarily elevated worker (14) working on an elevated power transmission line (16). The method and system (10) utilize a video camera system (30) that is temporarily elevated to a location (32) adjacent the worker (14) and that is configured to detect the presence of personnel (34) who enter the restricted area (12). The system (30) is configured to automatically alert personnel (34) at the worksite (17) who enter the restricted area (12) in response to detection of the personnel (34) by the system (30).

13 Claims, 3 Drawing Sheets

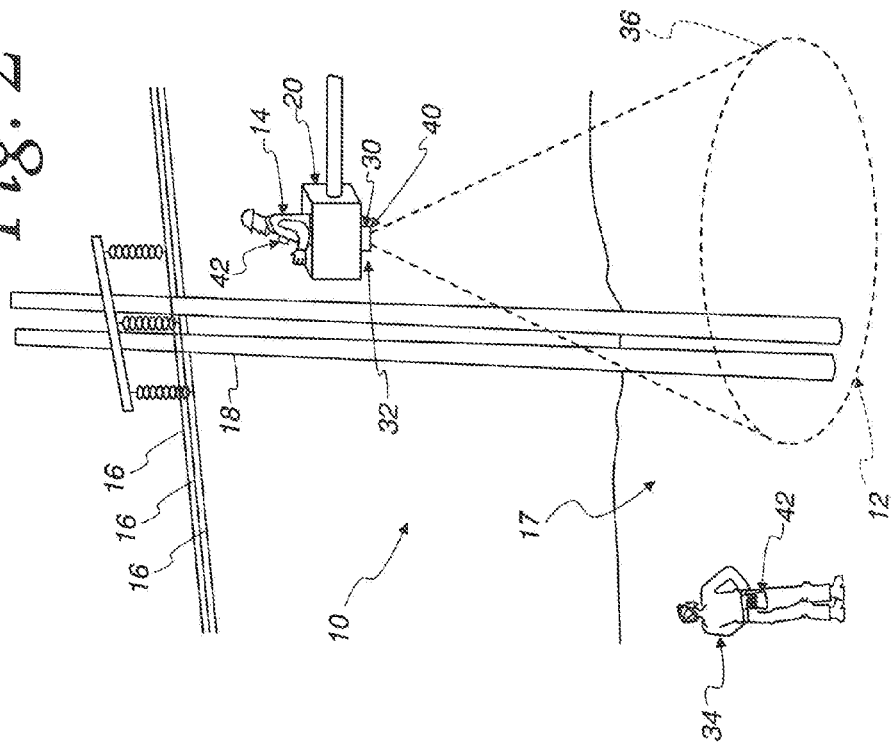
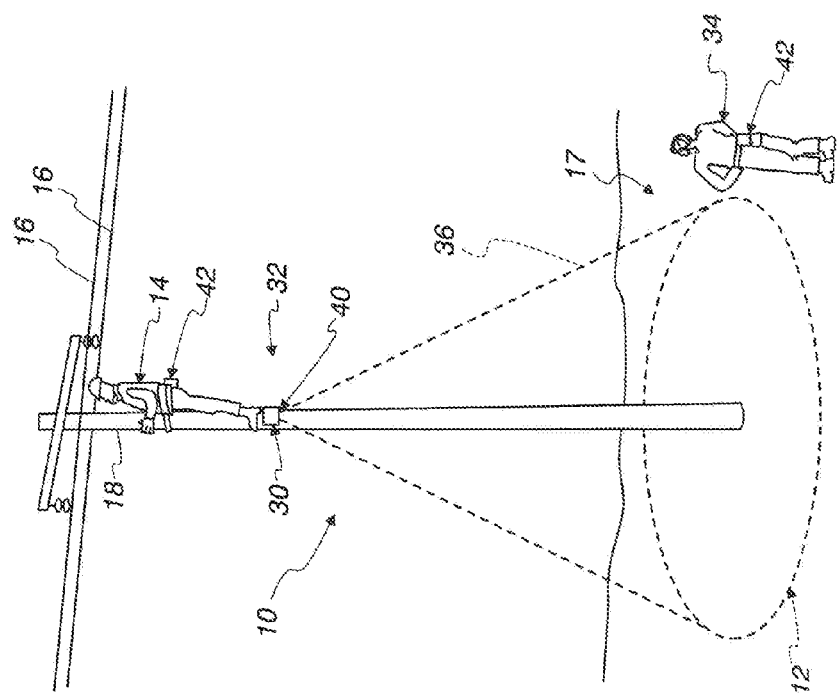

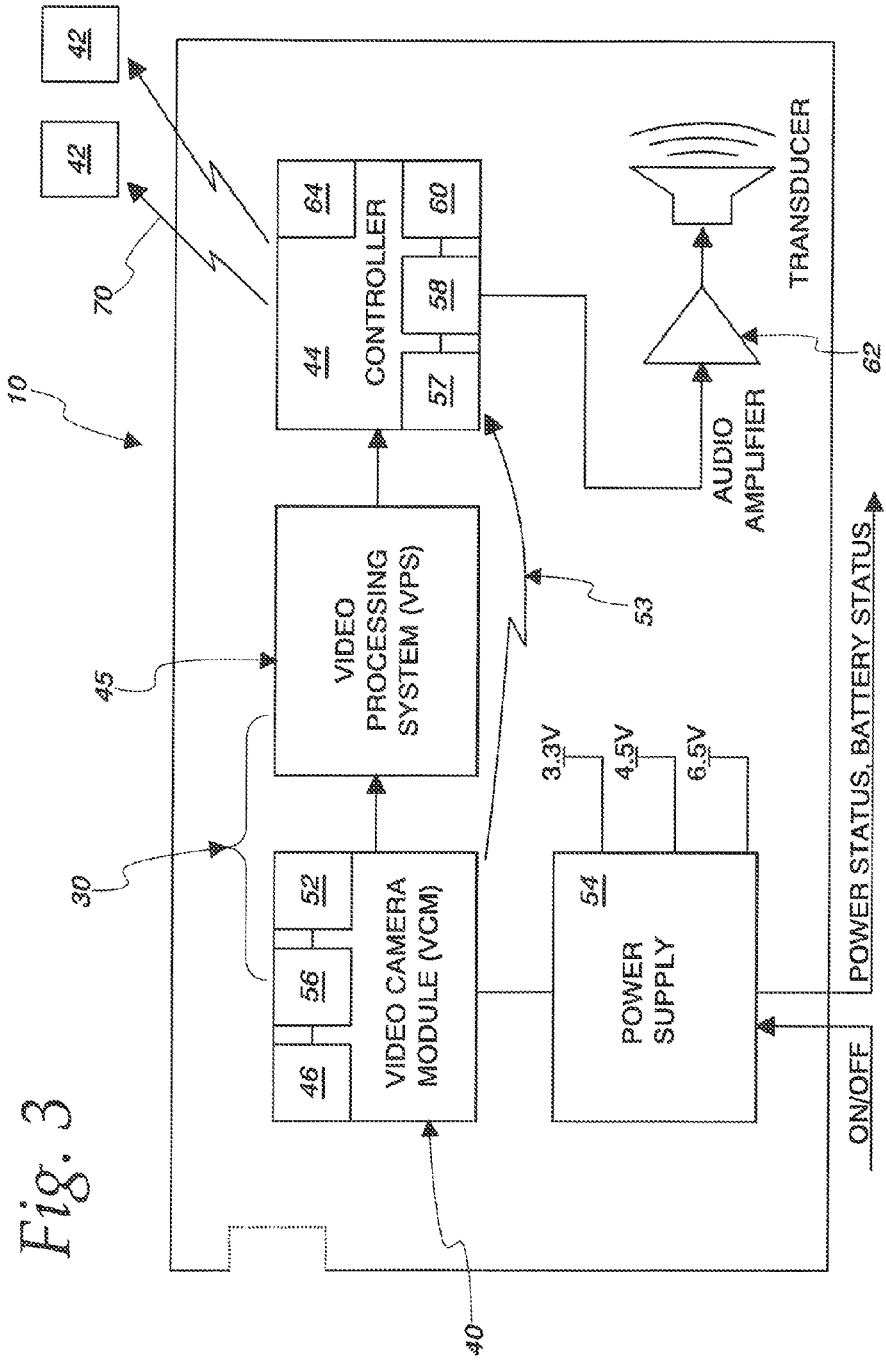

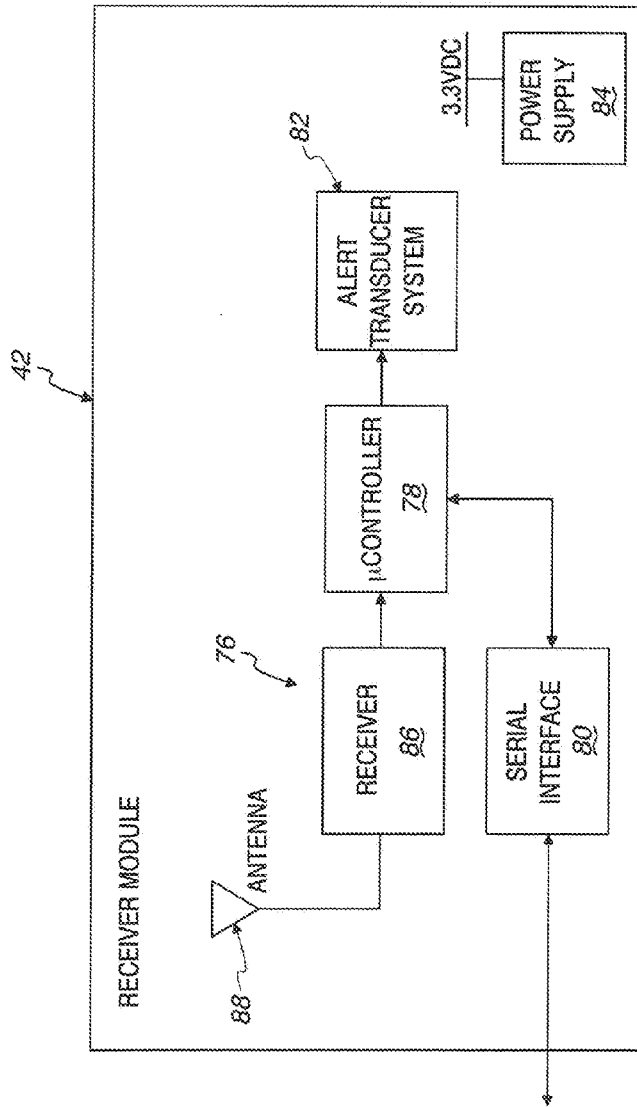

SYSTEM AND METHOD FOR VIDEO MONITORING OF RESTRICTED AREAS BELOW BUCKET TRUCKS, LINEWORKERS ON POWER DISTRIBUTION POLES OR OTHER ELEVATED LOADS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

In general, this application relates to the monitoring of restricted areas below temporarily elevated workers, such as, for example, construction workers on high rise buildings, tree trimming crews, installation and commissioning crews, and window washers. In one particular example, this application relates to wired distribution systems that utilize runs of transmission wires that are mounted overhead by poles and towers, such as electric power distribution systems that utilize distribution poles and towers to mount electric power transmission lines elevated at a safe distance above ground level, and to the work zones around such elevated wired distribution systems when one or more lineworkers are working on the elevated wired distribution system.

BACKGROUND

Elevated lines are widely used for the transmission of electrical power and communications. Such lines must be installed and regularly maintained and repaired. When a lineworker performs such tasks while inside an elevated bucket, the area below the bucket is considered hazardous. Crews of lineworkers working at ground level can be exposed to objects that can fall accidentally, including energized lines, tools or other material. The same hazardous conditions exist when a lineworker climbs a distribution pole or tower to perform a task. The area underneath an elevated lift bucket or a lineworker working on a pole is a restricted area that is often referred to as "line-of-fire" and is considered hazardous since there is a potential for falling objects such as tools or other materials.

To protect lineworkers against these hazards, utilities use standards and methods for establishing line-of-fire boundaries aimed at keeping lineworkers out of the restricted areas. For example cones are often used to cordon off an area considered hazardous. While these methods can be effective they are not capable of constantly monitoring and alerting lineworkers when someone crosses the boundary inadvertently. Accordingly, there is always room for improvement.

SUMMARY

In accordance with one aspect of the application, a method is provided for monitoring restricted areas below a temporarily elevated worker. The method includes the steps of elevating a video camera system to an elevated location adjacent a worker that is temporarily positioned above ground level, enabling the video camera system to detect the presence of other personnel who enter a ground level restricted area below the video camera system and the worker, automatically alerting personnel who enter the restricted area in response to detection of the personnel by the video camera, lowering the video camera system from the elevated location in response to the worker returning to ground level, and disabling the video camera system.

In one feature, the enabling step includes enabling a programmable processor to detect the presence of a person in the restricted area in response to an anomalous pattern in a time dependent series of optical (video) images of the restricted area.

As one feature, the enabling step includes automatically adjusting a size of the restricted area in response to changes in height of the elevated location. According to a further feature, the method further includes moving the video camera system with the worker in response to changes in the position of the worker. In yet a further feature, the method further includes the step of attaching the video camera system to a lift platform that alters the position of the worker above ground level.

According to one feature, the method further includes the step of temporarily attaching the video camera system to a pole structure that is ascended by the worker.

In one feature, the method further includes the step of attaching the video camera system to a lift platform that alters the position of the worker above ground level.

In accordance with one feature of the application, a system is provided for monitoring restricted areas below a temporarily elevated worker. The system includes a video camera configured to detect the presence of personnel who enter a ground level, restricted area below the video camera system when the video camera is elevated to an elevated location adjacent a temporarily elevated worker, and a programmable processor configured to automatically adjust a size of the restricted area in response to changes in height of the elevated location.

In accordance with one feature of the application, a system is provide for monitoring restricted areas below a temporarily elevated worker. The system includes a video camera module configured to detect the presence of personnel who enter a ground level, restricted area below the video camera module when the video camera module is elevated to an elevated location adjacent a temporarily elevated worker; and a video processing system for processing a video signal from the video camera module to determine the presence or absence of a person in the restricted area.

Other features and advantages will become apparent from a review of the entire specification, including the appended claims and drawings.

BRIEF DESCRIPTION OF THE DRAWINGS

FIG. 1 is a somewhat diagrammatic representation of a worksite at an elevated power transmission line employing a method and system for monitoring a restricted area below a temporary elevated worker on a power pole at the worksite;

FIG. 2 is a figure similar to FIG. 1, but showing the lineworker elevated in a lift bucket;

FIG. 3 is a diagrammatic representation of the system and method of FIGS. 1 and 2; and FIG. 4 is a diagrammatic representation of an active receiver module for use in the system and method of FIGS. 1-3.

DETAILED DESCRIPTION

With reference to FIGS. 1 and 2, a method and system are shown diagrammatically at 10 for monitoring a restricted area 12 below a temporarily elevated worker 14, such as a lineworker 14, working on an elevated power transmission line 16 at a worksite 17 after having ascended a distribution pole or tower 18 (FIG. 1) or having been elevated by a lifting device, such as a lift bucket 20 (FIG. 2). The method and system 10 utilize a video monitoring system 30 that is temporarily elevated to a location 32 adjacent the worker 14 and that is configured to detect the presence of personnel, such as other lineworkers 34, who enter the restricted area 12 below the video monitoring system 30 when the video monitoring system 30 is elevated to the location 32 adjacent the elevated worker 14. The restricted area 12 will typically be of a predetermined size at ground level below the elevated worker 14. In the is regard, the system 30 is configured to generate a field of view 36 at least corresponding to a desired size and location for the desired restricted area 12 so as to define a virtual restricted boundary conforming to the restricted area and to automatically alert personnel 34 at the worksite 17 who enter the restricted area 12 in response to detection of the personnel 34 by the video monitoring system 30. The video monitoring system 30 is either portable so it can be temporarily located on a power pole or transmission tower 18 that has been ascended by a worker 14, such as shown in FIG. 1, or is fixed to a lift platform 20 that supports the elevated worker 14, such as the lift bucket 20, so that the video monitoring system 30 moves with the worker 14 in response to changes in the position of the worker 14 and lift bucket 20, such as shown in FIG. 2.

While there are several possible technologies that can be utilized for the system 10, in one embodiment shown diagrammatically in FIG. 3, the system 10 includes a video camera unit or module 40, a plurality of receiver modules 42 worn by the personnel 34 (one module 42 per person 34) at the worksite 17, and a controller 44 in the form of a Decision Support Monitoring Console (DSMC) configured to automatically transmit an alert signal to the receiver modules 42 to activate an alarm in each module 42 whenever the video monitoring system 30 determines the presence of a person in the restricted area 12 based on an analysis by a video processing system 45 of a video signal generated by the video camera module 40. In some embodiments, the video processing system 45 is integrated with the video camera module 40 as a single package or unit. In other embodiments, the video processing system 45 can be a component package separately from the video camera module 40, but intended to be mounted with the video camera module 40 or with the controller 44. In yet other embodiments, the video processing system 45 can be part of an with the controller 44 as a single package or unit. In some embodiments the controller 44 can be located in the truck (not shown) of the lift bucket 20 or any other suitable location at the worksite 17 remote from the module 40. The video camera module 40, the remote controller 44, and the video processing system 45 combine to define the video monitoring system 30. In some embodiments, the alarm in each module 42 will continue to sound until the system 30 has determined that no person is present in the restricted area 12.

In one embodiment the video camera module 40 includes a video camera or sensor 46 with pan, tilt and zoom (PTZ) correction capability, a wireless transceiver or modem 52 coupled with the video camera 46 to wirelessly transmit a signal to the remote controller 44 (as shown at 53), and a power supply 54 for supplying power to the components 46 and 52. As previously mentioned, in some embodiments, the video camera module 40 will further include the video processing system 45, which will also be powered by the power supply 54. In such embodiments, the wireless transmitter 52 is configured to wirelessly transmit a signal 53 to the controller 44 indicating the presence or absence of personnel in the restricted area 12 based on an analysis by the video processing system of the video signal from the video camera 46. In embodiments where the video processing system 45 is a separate unit that is mounted with the remote controller 44 or where the video processing system 46 is part of an integrated package of the remote controller 44, the wireless transceiver 52 is configured to transmit a wireless signal 53 representative of the video signal generated by the camera. In embodiments wherein the video processing system 45 is mounted adjacent the video camera module 40 as a separate component, the video camera module 40 and the video processing unit 45 can be configured so that the video signal generated by the video camera is transmitted to the video processing system 46 and the analysis of the video processing system 46 is transmitted back to the video camera 40 so that it can be further transmitted to the remote controller 44 via the wireless transceiver 52. Optionally, the video camera module 40 can also include an alert transducer system or annunciator 56 that would also be powered by the power supply 54. Furthermore, the video camera module 40 can include additional video cameras or sensors 46 if required by a particular application to overcome blind spots and/or to provide an appropriate size and/or shape for the restricted area.

In some embodiments, the video camera module 40 further includes multi-mode communication ports so that the video camera module can be selectively configured in either a wired mode or a wireless mode, with the wired mode supporting an Ethernet connection/communication and the wireless mode supporting a plurality of wireless protocols, including Wi-Fi, Bluetooth or Zigbee protocols. In some embodiments, the wireless transceiver 52 is configured to operate in ISM band 2.4 GHz frequency.

In some embodiments, the video camera module 40 includes a height sensor either as a separate component or as an integrated part of the video camera 46, as is know. During initialization, the height sensor detects the distance between the camera lens and the ground level and provide a height input to the video camera which automatically adjusts the focal length of the camera so that the camera remains focused and the quality of image is consistent. Based upon the height information, an algorithm in the video processing system automatically defines the restricted area 12 that will be monitored within the field of view of the video camera 46. The video camera unit 40 captures a first set of video frames within the restricted area and transmits those frames to the video processing system 45, with the initial set of frames being images of the background terrain in the restricted area and which are to be considered as a reference profile or master frame against which future video frames are compared to determine the presence or absence of personnel in the restricted area. Furthermore, the video camera unit 40 is stabilized by executing a set of algorithms in the video processing system 45 as part of the initialization of the system 30 and the module 40, including visual stabilization, vibration correction, shadow correction, eliminating minor moving objects like flies, pieces of paper, grass, dust and so on. These algorithms can also compensate for changing conditions during the monitoring mode, such as shadow correction due to cloud movement or fixed or mobile entities such as personnel moving outside of the restricted area 12, vibration due to wind, and flying objects. The video camera module 40, the video processing system 45 and the controller 44 all synchronize and verify communication by exchanging test signals to complete initialization of the system 30. Once initialized the system 30 is ready in monitoring mode.

The video processing system 45 includes a programmable processor or microcontroller with advanced digital signal processing to convert image frames into decision bit stream and algorithms that perform image frame comparison and geometric analysis of objects on the ground plane. The video processing system 45 uses these algorithms to compare each frame of image with the reference profile/master frame to determine the presence or absence of personnel in the restricted area. The video processing system generates a flag in the form of a high state 1 to indicate the presence of personnel in the restricted area 12 and a low state 0 to indicate the absence of personnel in the restricted area 12. The video stream and the flag are transmitted to the controller 44.

While there are many known controller or computing devices (such as dedicated servers, desk top computers, lap top computers, tablet computers, etc) that can receive, process, and transmit wireless and Ethernet signals, as best seen in FIG. 3, in one embodiment, the remote controller 44 includes a plurality of wireless transceivers or modems 57, a computer processor in the form of a microcontroller 58, a user interface 60 including a display, an alert transducer system or annunciator 62, and a power supply 64 connected to provide power to the components 58, 60, and 62 of controller 44. The power supply 84 can be in the form of a rechargeable battery and/or a powered connection to a power source at the worksite 17, such as a power source in the truck of the lift bucket 20. The controller 44 is configured for the wireless transceiver 58 to receive the wireless signal 53 from the video camera module 40 and to transmit a wireless alert signal 70 from one or more of the wireless transceivers 57 to the receiver modules 42 to initiate an alarm in each module 42 in response to an signal from the video processing system that a person has entered the restricted area 12.

The system 30 can be configured for automatic re-initialization, stabilization and recalibration of the video camera module 40 for every stabilized position of the bucket 20 after movement of the bucket 20 or after movement of the module 40 if not attached to the bucket 20. The system 30 can also be configured to store the video data as an event recording for processing of the scenario. It should be appreciated that the system 30 can be utilized in any situation wherein people work at heights with ground crew involvement.

The controller 44 can display the video data in various forms, such as, for example, frame-by-frame images, video, tabular, graphs, and alphanumeric characters. In addition to sending the alert signal to the receiver modules 42, the controller 44 can also be configured to generate a local alarm, in form of an audio, video, or both signal via the alert transducer system 62. In some embodiment, a false alarm can be reduced or prevented by taking a statistical average of multiple consecutive indications that a person is present in the restricted area before actually signaling an alarm.

While there are many known handheld or user carried devices (such as cellular phones, pagers, wireless radios, etc.) that can receive and process wireless signals to initiate an alarm (visual, audio, or both) in response to an wireless alert signal, as best seen in FIG. 4, in one embodiment, the receiver module 42 includes a receiver section 76, a programmable processor in the form of a microcontroller 78, a serial interface 80, an alert transducer system or annunciator 82, and a power supply 84 connected to provide power to the components 76, 78, 80 and 82 of the receiver module 42. The receiver section 76 includes a receiver 86 and a receiving antenna 88. The power supply 84 will typically be in the form of a battery, and in some embodiments a rechargeable battery.

In some embodiments, all the electronics can be battery operated with rechargeable batteries. Alternatively, the electronics can be powered with a hard connection through the bucket truck power supply using any suitable electrical connection. In some embodiments, a sleep mode can be provided for battery conservation.

In some embodiments the video camera module 40 is configured to automatically transmit a wireless alert signal to the receiver modules 42 to activate an alarm (visual, audio, or both) in each of the receiver modules 42 if the video camera processing system 45 determines that a person has entered the restricted area 12.

While certain specific embodiments have been shown and described herein, it should be appreciated that other embodiments and modifications are possible within the scope of the disclosure and that specific structures and steps should not be read into the claims unless expressly recited therein. It should further be appreciated that while the system and method 30 have been described herein in connection with elevated power transmission lines, the system and method may be employed in any situation wherein a worker or other person is temporarily elevated above a site that may be entered by other people or personnel. Accordingly, the system and method 30 are not limited to use in connection with elevated power transmission lines. It should further be understood that in some situations, the system and method 30 described herein may be employed when just a load, such as a pallet of commercial or construction items, is temporarily elevated above a site that may be entered by other people or personnel.

The invention claimed is:

1. A method for monitoring restricted areas below a temporarily elevated worker, the method comprising the steps of:
   elevating a video camera module to an elevated location adjacent a worker that is temporarily positioned above ground level;
   enabling the video camera module to detect the presence of other personnel who enter a ground level restricted area below the video camera module and the worker;
   automatically alerting personnel who enter the restricted area in response to detection of the personnel by the video camera module;
   lowering the video camera module from the elevated location in response to the worker returning to ground level; and
   disabling the video camera module,
   wherein the enabling step comprises automatically adjusting a size of the restricted area in response to changes in height of the elevated location.

2. The method of claim 1 wherein the enabling step comprises initializing the video camera module by determining a distance from the module to the ground level.

3. The method of claim 1 further comprising moving the video camera module with the worker in response to changes in the position of the worker.

4. The method of claim 3 further comprising the step of attaching the video camera module to a lift platform that alters the position of the worker above ground level.

5. The method of claim 1 further comprising the step of temporarily attaching the video camera module to a pole structure that is ascended by the worker.

6. The method of claim 1 further comprising the step of attaching the video camera module to a lift platform that alters the position of the worker above ground level.

7. The method of claim 1 wherein the enabling step comprises calibrating the video camera system by capturing an initial set of video frames of the background terrain in the restricted area with no personnel in the restricted area and storing the initial set of video frames for comparison to future video frames captured by the video camera.

8. The method of claim 7 further comprising the step of automatically re-calibrating the video camera system with in response to a change in the elevated location.

9. The method of claim 7 comprising the step of detecting the presence or absence of personnel in the restricted area in response to a comparison of newly captured video frames to the initial set of video frames.

10. The method of claim 1 further comprising the step of wirelessly transmitting a data signal representative of the video signal to a controller and processing the data signal in the controller to determine the presence or absence of personnel in restricted area.

11. The method of claim 1 comprising the step of wirelessly transmitting an alert signal automatically from the controller to at least one remote receiver configured to receive the alert signal and generate an alarm to a worker carrying the receiver in response to an indication that a person is in the restricted area.

12. A system for monitoring restricted areas below a temporarily elevated worker, the system comprising:
- a video camera module configured to detect the presence of personnel who enter a ground level, restricted area below the video camera module when the video camera module is elevated to an elevated location adjacent a temporarily elevated worker; and
- a programmable processor configured to automatically adjust the predetermined size of the restricted area in response to changes in height of the elevated location.

13. The system of claim 12 further comprising:
- a video processing system for processing a video signal from the video camera module to determine the presence or absence of a person in the restricted area.

* * * * *